United States Patent
Bryant

(10) Patent No.: US 11,320,321 B2
(45) Date of Patent: May 3, 2022

(54) DETERMINING A CHARACTERISTIC TEMPERATURE OF AN ELECTRIC OR ELECTRONIC SYSTEM

(71) Applicant: Maschinenfabrik Reinhausen GmbH, Regensburg (DE)

(72) Inventor: Angus Bryant, Cambridge (GB)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 0 days.

(21) Appl. No.: 17/276,862

(22) PCT Filed: Sep. 19, 2019

(86) PCT No.: PCT/EP2019/075227
§ 371 (c)(1),
(2) Date: Mar. 17, 2021

(87) PCT Pub. No.: WO2020/058435
PCT Pub. Date: Mar. 26, 2020

(65) Prior Publication Data
US 2021/0318179 A1    Oct. 14, 2021

(30) Foreign Application Priority Data
Sep. 21, 2018   (EP) ..................... 18196070

(51) Int. Cl.
*G01K 7/42* (2006.01)
*G01K 7/16* (2006.01)
*G01K 13/10* (2006.01)

(52) U.S. Cl.
CPC ............. *G01K 7/42* (2013.01); *G01K 7/16* (2013.01); *G01K 13/10* (2013.01)

(58) Field of Classification Search
CPC ........ F01D 17/085; G01K 7/42; G01K 13/26; G01K 13/02; G01K 1/14; G01K 17/00;
(Continued)

(56) References Cited

U.S. PATENT DOCUMENTS 4,525,763 A * 6/1985 Hardy ................. G01R 31/343
                                                    318/472
6,006,168 A * 12/1999 Schumann ............ G01K 17/00
                                                    374/134
(Continued)

FOREIGN PATENT DOCUMENTS

CN         206760250 U  * 12/2017
EP          3591836 A1  *  1/2020  ............. H02P 29/64
(Continued)

*Primary Examiner* — Gail Kaplan Verbitsky
(74) *Attorney, Agent, or Firm* — Leydig, Voit & Mayer, Ltd.

(57) ABSTRACT

A method determines a characteristic temperature of an electric or electronic system. The method includes: during operation of the system, measuring one or more characteristic parameters of the system; estimating the characteristic temperature based on a thermal model of the system and a first subset of the measured characteristic parameters; predicting a first value for a temperature-sensitive electrical parameter (TSEP) based on a TSEP model and the estimated characteristic temperature; determining a second value for the TSEP based on a second subset of the measured characteristic parameters; comparing the first value and the second value for the TSEP; and adapting the thermal model or the TSEP model based on a result of the comparison.

17 Claims, 2 Drawing Sheets

(58) Field of Classification Search
CPC .......... G01K 13/026; G01K 3/08; G01K 1/16;
G01K 7/16; G01K 13/10; G01K 2205/00
See application file for complete search history.

(56) References Cited

U.S. PATENT DOCUMENTS

| | | | | |
|---|---|---|---|---|
| 6,504,772 | B2* | 1/2003 | Maeno | G11C 29/50 365/201 |
| 8,694,180 | B2* | 4/2014 | Glassl | H02J 7/14 701/3 |
| 10,001,800 | B1* | 6/2018 | Takayanagi | G06F 1/3243 |
| 10,697,836 | B2* | 6/2020 | Lee | G01R 31/42 |
| 10,985,694 | B2* | 4/2021 | Charles | H02S 50/10 |
| 2006/0250154 | A1* | 11/2006 | Gao | G01R 31/343 324/765.01 |
| 2008/0197228 | A1* | 8/2008 | Mueller | B65H 23/195 242/410 |
| 2010/0030510 | A1 | 2/2010 | Koehler et al. | |
| 2012/0110386 | A1* | 5/2012 | Hancock | G01R 31/40 714/41 |
| 2018/0017612 | A1 | 1/2018 | Burton-Ccoca et al. | |
| 2018/0101190 | A1* | 4/2018 | Lee | G05F 3/30 |
| 2019/0023252 | A1* | 1/2019 | Miller, Jr. | B60T 17/221 |
| 2019/0050032 | A1* | 2/2019 | Wang | G06F 11/3433 |
| 2019/0339137 | A1* | 11/2019 | Krishnaswamy | G01K 15/005 |
| 2020/0099330 | A1* | 3/2020 | Pacha | G01K 7/01 |
| 2020/0204061 | A1* | 6/2020 | Minesawa | H02M 7/53876 |

FOREIGN PATENT DOCUMENTS

| | | | | | |
|---|---|---|---|---|---|
| FR | 3018557 | A1 * | 9/2015 | ............. | F02N 11/10 |
| JP | 406054572 | A * | 2/1994 | | |
| WO | WO-03089919 | A1 * | 10/2003 | ............... | G01K 7/42 |
| WO | WO-2015110107 | A2 * | 7/2015 | ............. | H02P 29/60 |

* cited by examiner

DETERMINING A CHARACTERISTIC TEMPERATURE OF AN ELECTRIC OR ELECTRONIC SYSTEM

CROSS-REFERENCE TO PRIOR APPLICATIONS

This application is a U.S. National Phase Application under 35 U.S.C. § 371 of International Application No. PCT/EP2019/075227, filed on Sep. 19, 2019, and claims benefit to European Patent Application No. EP 18196070.9, filed on Sep. 21, 2018. The International Application was published in English on Mar. 26, 2020 as WO 2020/058435 under PCT Article 21(2).

FIELD

The present invention relates to a method for determining a characteristic temperature of an electric or electronic system and to an electric or electronic system.

BACKGROUND

In electric or electronic systems or devices, specific characteristic temperatures may be of particular interest due to their effects for example on reliability, lifetime or rate of degradation. In some cases, a characteristic temperature exceeding a certain absolute limit can also lead to the destruction of the device or system. Therefore, it may be vital or at least desirable to determine or monitor a characteristic temperature during operation of the system or device.

However, in many situations a direct measurement of the characteristic temperature of interest may be impractical or not feasible, for example due to a harsh environment. In particular, this may be the case for junction temperatures of power semiconductor devices, since during operation they typically are electrically "live" and in a highly noisy environment. Other examples include a winding temperature of a power transformer or reactor or a characteristic temperature within an on-load tap changer, for example a resistor temperature.

Existing approaches to an indirect estimation of such characteristic temperatures require a prior calibration of each individual system or device, which is impractical in industrial applications and in particular virtually impossible in case of semiconductor devices. Other approaches require specific laboratory settings or dedicated operation modes of the system or device, in some cases also a specific compatible load.

SUMMARY

An embodiment of the present invention provides a method that determines a characteristic temperature of an electric or electronic system. The method includes: during operation of the system, measuring one or more characteristic parameters of the system; estimating the characteristic temperature based on a thermal model of the system and a first subset of the measured characteristic parameters; predicting a first value for a temperature-sensitive electrical parameter (TSEP) based on a TSEP model and the estimated characteristic temperature; determining a second value for the TSEP based on a second subset of the measured characteristic parameters; comparing the first value and the second value for the TSEP; and adapting the thermal model or the TSEP model based on a result of the comparison.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
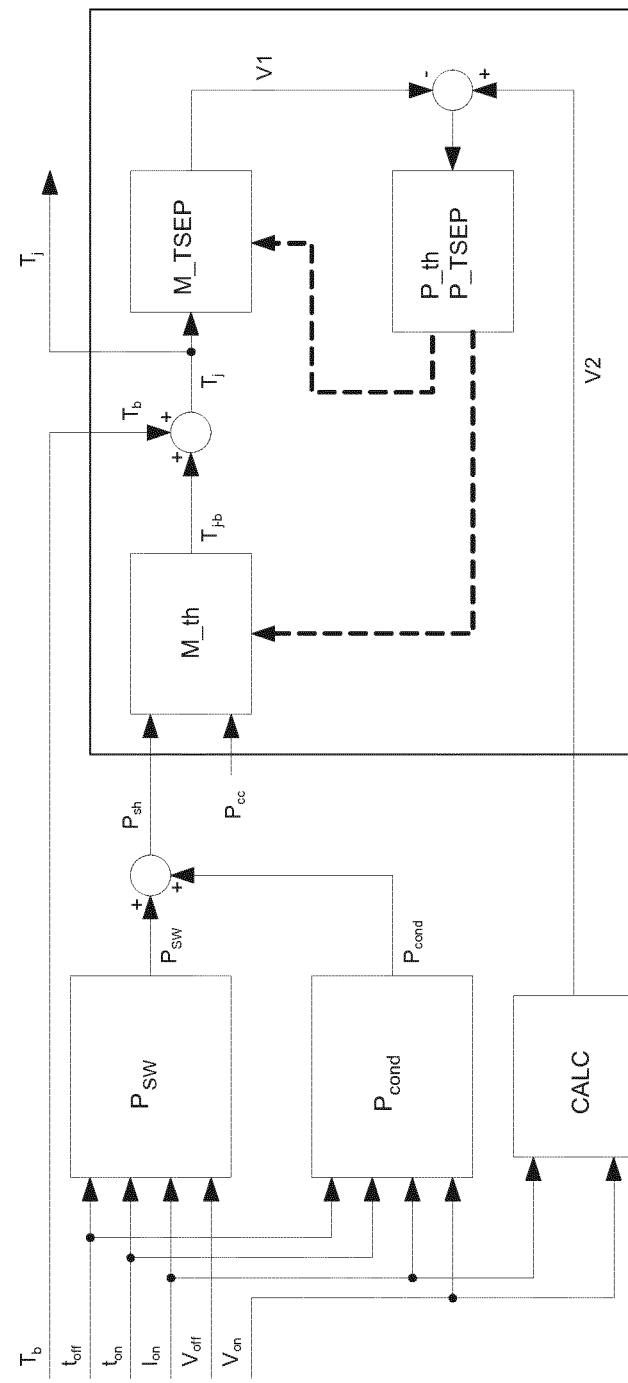
FIG. 1 shows a flow diagram of an exemplary implementation of method according to the improved concept.

Embodiments of the present invention provide an improved concept for determining a characteristic temperature of an electric or electronic system that may be performed during normal operation of the system or device and does not require a calibration prior to the operation.

The improved concept of embodiments of the present invention is based on the idea to implement an auto- or self-calibration of the system by estimating the characteristic temperature based on a thermal model of the system and predicting a first value of a temperature-sensitive electrical parameter, TSEP, of the system based on a TSEP model and an output of the thermal model. The first value is compared to a second value for the TSEP based on a measurement. The thermal and/or of the TSEP model are then adapted to match the two values for the TSEP.

According to the improved concept of embodiments of the present invention, a method for determining a characteristic temperature of an electric or electronic system is provided. The method comprises measuring one or more characteristic parameters, in particular electric parameters and/or thermal parameters and/or temperatures, of the system during operation of the system and estimating the characteristic temperature of the system based on a thermal model of the system and on a first subset of the measured parameters. Then a first value for a TSEP is predicted based on a TSEP model and on the estimated characteristic temperature. A second value for the TSEP is determined based on a second subset of the measured parameters. Then, the first value for the TSEP is compared to the second value for the TSEP and the thermal model and/or the TSEP model is adapted based on a result of the comparison.

The first and the second subset may contain one or more parameters, respectively. The subsets may overlap or be disjoint. Alternatively, the subsets may be identical, in particular be identical and contain only one parameter, respectively.

The TSEP model may be a pre-determined model. The same holds for the thermal model. The thermal model may contain a model for determining a thermal impedance of the system. The thermal model may for example be based on or include a finite-element method, a reduced-order model, a thermal resistor-capacitor network model. In particular, the reduced-order model or the thermal resistor-capacitor network model may be fitted to the finite-element model.

Performing the method, in particular the measurements, during operation means performing it during a normal or productive operation for which the system is intended. In particular, it is neither necessarily performed during production of the system or device, in a test environment nor in a dedicated calibration mode of operation.

In some implementations, the method comprises running the electric or electronic system or a part of it through a training sequence for example before an initial, in particular initial normal, operation of the system. The training sequence may improve a convergence of the auto-calibration according to the improved concept.

The TSEP is a TSEP of the system, in particular of an electric or electronic device comprised by the system.

The TSEP model being adapted may for example mean that parameters used to predict the TSEP based on the characteristic temperature, for example fit parameters or regression parameters, are adapted.

The thermal model being adapted may for example mean that parameters used to determine the thermal impedance are adapted.

Comparing the first and the second value for the TSEP may for example comprise determining a difference between these values. The result of the comparison may for example comprise the difference.

By means of a method according to an embodiment of the present invention as described, the drawbacks of both approaches, temperature simulation based on thermal modelling and temperature estimation based on a measured TSEP, are overcome. In particular, characteristic temperatures from both approaches are not compared but instead respective TSEP values are. In this way one gets rid of the need for calibrating the temperature estimation based on measured TSEPs. The accuracy of deducing the second value for the TSEP will not change throughout the lifetime of the system and therefore will track correctly any changes in electrical and thermal parameters, for example due to degradation or measurement circuit drift. On the other hand, deducing the first value for the TSEP will correctly reflect ambient temperature or other temperatures of the system affecting the characteristic temperature and for example power losses of the system. This can be viewed as using the thermal model to calibrate the TSEPs, or using the measurements to keep the thermal model tracking correctly. Either way, the full electro-thermal system is characterized, namely both an effective electrical calibration and a thermal characterization.

A final result of the method may for example be given by the characteristic temperature which will be valid in case of matching first and second value for the TSEP.

According to several embodiments, the method comprises predicting a first value for a further TSEP, in particular of the system or a device of the system, based on a further TSEP model and the estimated characteristic temperature. A second value for the further TSEP is determined based on the second subset of the measured parameters. The first value for the further TSEP is compared to the second value for the further TSEP. The adaption of the thermal model or the TSEP model is based on a result of the comparison of the first value and the second value for the further TSEP as well as on the result of the comparison of the first value and the second value for the TSEP.

Matching two independent TSEPs by adapting said models may further improve the accuracy of the temperature estimation.

According to several embodiments, the method further comprises repeating at least the steps of measuring the characteristic parameters, estimating the characteristic temperature and predicting the first value for the characteristic temperature. For the repetition, the adapted thermal model is used instead of the thermal model and/or the adapted TSEP model is used instead of the TSEP model.

In order to improve the temperature estimation, the repeated steps may be repeated several times. For each repetition, the adapted thermal or TSEP model of the preceding repetition is used. For example, the repeated steps may be repeated until the difference between the first and the second value for the TSEP is smaller than a predefined threshold and, if applicable, the difference between the first and the second value for the further TSEP is smaller than a predefined further threshold.

According to several embodiments, the characteristic temperature is a characteristic temperature of an electric or electronic device comprised by the system.

According to several embodiments, the electric or electronic system is a power electronic system, for example a power converter, and the characteristic temperature is a characteristic temperature, in particular a junction temperature, of a power semiconductor device comprised by the system.

According to several embodiments, the first subset of the one or more measured characteristic parameters comprises an on-state, that is forward, current of the power semiconductor device and/or an on-state, that is forward, voltage of the power semiconductor device and/or an off-state voltage of the power semiconductor device and/or a total on-state duration of the power semiconductor device within a respective measurement interval and/or a total off-state duration of the power semiconductor device within the respective measurement interval and/or a reference temperature of the power electronic system.

According to several embodiments, the reference temperature is a baseplate temperature or a thermistor temperature of the power electronic system.

According to several embodiments, the second subset of the one or more measured characteristic parameters comprises the on-state current and/or the on-state voltage of the power semiconductor device.

According to several embodiments, the TSEP and/or the further TSEP is given by the on-state voltage of the power semiconductor device, in particular at a predefined on-state current of the power semiconductor device, a gate threshold voltage of the power semiconductor device, an internal gate resistance of the power semiconductor device or a characteristic switching parameter of the power semiconductor device, in particular at a predefined on-state voltage or off-state voltage or on-state current.

In some implementations, the characteristic switching parameter is given by a rate of change of current with respect to time di/dt, a rate of change of voltage with respect to time dv/dt, a switching peak current or a switching peak voltage.

According to several embodiments, the step of estimating the characteristic temperature comprises determining a power dissipation due to the device and using the power dissipation as an input to the thermal model.

According to several embodiments, the power dissipation comprises a switching power dissipation and/or a conduction power dissipation of the power semiconductor device.

According to several embodiments, the step of estimating the characteristic temperature comprises determining a cross-coupling power dissipation due to a further device or several further devices of the system and using the cross-coupling power dissipation as an input, in particular a further input, to the thermal model.

According to the improved concept, also an electric or electronic system is provided. The system comprises an electric or electronic device, a measuring unit and a computing unit. The measuring unit is configured to measure one or more characteristic parameters of the device during operation of the electric or electronic system.

The computing unit is configured to estimate a characteristic temperature of the device based on a thermal model of the system and a first subset of the measured parameters, to predict a first value for a TSEP based on a TSEP model and the estimated characteristic temperature, to determine a second value for the TSEP based on a second subset of the measured parameters, to compare the first value and the second value for the TSEP and to adapt the thermal model or the TSEP model based on a result of the comparison.

According to several embodiments, the electric or electronic system comprises a transformer, in particular a power transformer, for example filled with an insulation agent, in particular a liquid insulation agent. The electric or electronic device comprises a winding of the transformer and the characteristic temperature is given by a winding temperature, in particular a hot spot winding temperature, of the transformer.

According to several embodiments, the electric or electronic system comprises a reactor, for example a shunt reactor, or an inductor for example filled with an isolation medium. The electric or electronic device comprises a winding of the reactor and the characteristic temperature is given by a winding temperature, in particular a hot spot winding temperature, of the reactor.

According to several embodiments, the electric or electronic system comprises an on-load tap changer, for example an on-load tap changer of the resistor type. The characteristic temperature is given by a temperature within the on-load tap changer, for example a temperature of a resistor of the on-load tap-changer.

According to several embodiments, the electric or electronic system comprises a power electronic system and the electric or electronic device comprises a power semiconductor device. The characteristic temperature is given by a junction temperature of the power semiconductor device.

According to several embodiments, the power semiconductor comprises a transistor, for example an insulated-gate bipolar transistor, IGBT, or a bipolar junction transistor, BJT, or a MOS field effect transistor, MOSFET, or a junction field effect transistor, JFET, or a high-electron-mobility transistor, HEMT.

According to several embodiments, the power semiconductor comprises a thyristor or a diode, for example a Schottky diode or a PIN diode.

According to several embodiments, the power electronic system comprises a power converter and the power converter comprises the power semiconductor device.

According to several embodiments, the power electronic system comprises a solid-state circuit breaker, a solid-state relay, a thyristor switch or a static VAR compensator, which comprises the power semiconductor device.

Further implementations and embodiments of the electric or electronic system according to the improved concept follow readily from the various implementations and embodiments of the method according to the improved concept and vice versa. In particular, individual or several components or arrangements described with respect to the electric or electronic system may be implemented accordingly for performing a method according to the improved system.

In the following, the invention is explained in detail with respect to exemplary embodiments by reference to the drawings. Components that are functionally identical or have an identical effect may be denoted by identical reference signs. Identical components or components with identical functions or effects may be described only with respect to the figure where they occur first. Their description is not necessarily repeated in subsequent figures.

FIG. 1 shows a flow diagram of an exemplary implementation of a method according to the improved concept.

In the shown exemplary and non-limiting case, the electric or electronic system comprises a power converter with a power semiconductor device. The following discussion with respect to FIG. 1, however, applies analogously for other types of electric or electronic systems, as explained for example with respect to FIG. 3. During the operation of the power converter, one or more characteristic parameters of the system are measured. In the shown example, a reference temperature $T_b$ of the power converter and plurality of electrical parameters of the power converter including a total off-state duration $t_{off}$ of the power semiconductor device, a total on-state duration $V_{on}$ of the power semiconductor device, an on-state current $I_{on}$ of the power semiconductor device, an off-state voltage $V_{off}$ of the power semiconductor device and an on-state voltage $V_{on}$ of the power semiconductor device is measured within a predetermined measurement interval of duration $T_i$.

For example, a switching power loss Psw is determined from the on- and off-state durations $t_{on}$, $t_{off}$, the on-state current $I_{on}$, and the off-state voltage $V_{off}$.

For example, a conduction power loss $P_{cond}$ is determined from the on- and off-state durations $t_{on}$, $t_{off}$, the on-state current $I_{on}$, and the on-state voltage $V_{on}$, for example according to the relation.

The conduction power loss $P_{cond}$ and the switching power Psw loss may be added up and their sum may be used as an input for a thermal model M_th. The sum corresponds to a power dissipation due to self-heating $P_{sh}$ of the power semiconductor device. Optionally, a cross-coupling power dissipation $P_{cc}$ due to further devices of the power converter, which may affect the junction temperature $T_j$ of the power semiconductor device may be determined and used as an additional input to the thermal model M_th.

An output of the thermal model M_th may represent a temperature difference $T_{a-b}$ between the junction temperature $T_j$ and the reference temperature $T_b$, which may for example be a baseplate temperature or a temperature of an internal thermistor of the of the power converter. Therefore, the reference temperature $T_b$ may be added to the output of the thermal model M_th, resulting in an estimate for the junction temperature $T_j$.

Then, the estimated junction temperature $T_j$ may be used as an input to a TSEP model M_TSEP. An output of the TSEP model M_TSEP represents a first value V1 for one or more TSEPs of the power converter, in particular the power semiconductor device. The one or more TSEPs may include the on-state voltage $V_{on}$, a gate threshold voltage, an internal gate resistance and/or a characteristic switching parameter of the power semiconductor device.

The TSEP model M_TSEP may for example use the fact that, in a steady state of the power semiconductor device, a rate of change of the junction temperature $T_j$ is equal to a rate of change of the reference temperature $T_b$ for a constant power dissipation. Therefore, the junction temperature $T_j$ may follow the reference temperature $T_b$ with an offset. The offset may correspond to a respective thermal resistance multiplied by the constant power dissipation. Furthermore, also the on-state voltage $V_{on}$ follows the rate of temperature change, albeit with a scale factor.

A second value V2 for the one or more TSEPs is obtained from a subset of the measured parameters, in the shown example from the on-state current $I_{on}$ and/or the on-state voltage $V_{on}$ (see calculation block CALC). In a simple example, the second value V2 depends only on the on-state voltage $V_{on}$ or may be equal to the on-state voltage $V_{on}$. In the latter case, no calculation step CALC is necessary. However, in alternative cases of more complex TSEPs, for example switching parameters of the power semiconductor device, also the on-state current $I_{on}$ and the calculation step CALC may be necessary.

Respective first and second values V1, V2 of the TSEPs are compared to each other, in particular respective differences are determined. Depending on the differences, thermal parameters P_th of the thermal model M_th and/or TSEP parameters P_TSEP of the TSEP model M_TSEP are adapted and used to adapt the models M_th, M_TSEP accordingly.

In case the differences between the first and second values V1, V2 are sufficiently small, for example all lie below respective threshold values, the junction temperature $T_j$ may be considered as a final result of the junction temperature determination. Otherwise, the junction temperature $T_j$ may be determined again based on the adapted models M_th, M_TSEP and so forth.

Figure 2A:
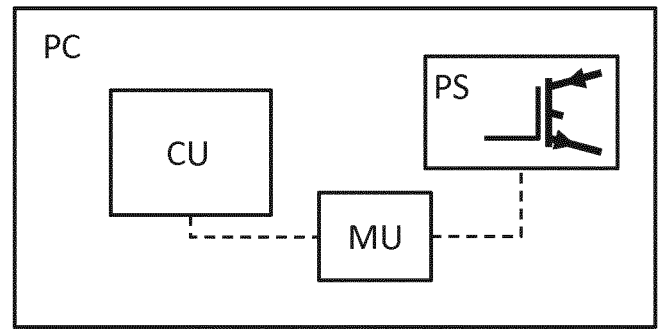
FIG. 2A shows a block diagram of an exemplary embodiment of an electric or electronic system according to the improved concept.

FIG. 2A shows a block diagram of an exemplary embodiment of an electric or electronic system according to the present invention.

The system comprises a power converter PC containing one or more (for simplicity only one is shown) power semiconductor devices PS, for example IGBTs, BJTs, MOSFETs, HEMTs, JFETs, thyristors or diodes. The circuit symbol of an IGBT is shown in FIG. 2A only as a non-limiting example.

The power converter PC further comprises a measuring unit MU for determining electrical parameters of the power converter PC, in particular of the power semiconductor device PS, including for example one or more of the measured parameters explained with respect to FIG. 1.

The power converter PC also comprises a computing unit CU for performing one or more of the computational steps described with respect to FIG. 1.

The computing unit CU and the measuring unit MU may for example be comprised by a drive unit or a control unit of the power converter PC or may be part of a separate circuit of the power converter PC.

Figure 2B:
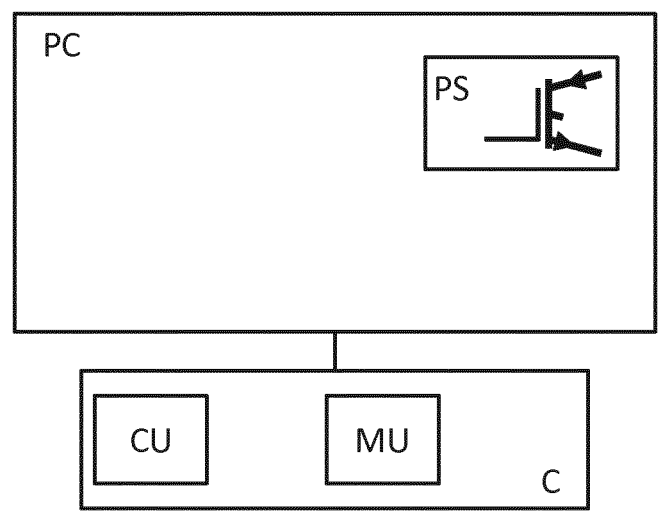
FIG. 2B shows a block diagram of a further exemplary embodiment of an electric or electronic system according to the improved concept.

FIG. 2B shows a block diagram of a further exemplary embodiment of an electric or electronic system according to the improved concept.

The system of FIG. 2B is identical to the system of FIG. 2A, except for the arrangement of the computing unit CU and the measuring unit MU. In particular, the computing unit CU and the measuring unit MU are not part of the power converter PC but are comprised by a circuit C coupled to the power converter PC. The circuit may for example comprise a microprocessor including the computing unit CU.

Figure 3:
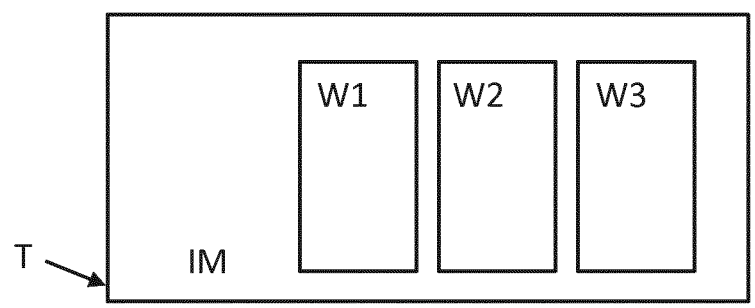
FIG. 3 shows a block diagram of a further exemplary embodiment of an electric or electronic system according to the improved concept.

FIG. 3 shows a block diagram of a further exemplary embodiment of an electric or electronic system according to the improved concept.

The system comprises a power transformer or a reactor, in particular a shunt reactor, with a tank T. One or more windings W1, W2, W3 are arranged within the tank T. The tank T may for example for be filled or partly filled with an insulation agent IM, for example a transformer oil.

In such a system, the characteristic temperature is a winding temperature or hot spot temperature of one of the windings W1, W2, W3.

With respect to the discussion of FIG. 1, the winding temperature replaces the junction temperature Tj. An ambient temperature of the transformer or reactor or a temperature of the insulation agent IM may replace the base plate temperature $T_b$ of FIG. 1. The total on- and off-state durations $t_{on}$, $t_{off}$ as well as the on- and off-state voltages $V_{on}$, $V_{off}$ and the on-state current $I_{on}$ of FIG. 1 may be replaced by appropriate quantities affecting the power dissipation of the transformer or reactor. In fact, all necessary inputs to a thermal model M_th of the transformer or reactor are case dependent and known or straight forwardly derivable to the skilled reader. The TSEP for which the first and the second values V1, V2 are determined may be replaced by any temperature-sensitive parameter of the transformer or rector, for example an electrical resistance of one of the windings W1, W2, W3.

With these or other suitable replacements, the method described with respect to FIG. 1 may also be carried out analogously for the transformer or reactor.

With respective suitable replacements, the method described with respect to FIG. 1 may also be carried out analogously for an on-load tap changer.

By means of a method or a system according to the improved concept of the present invention, it is possible to determine the characteristic temperature of an electric or electronic system without prior calibration and during normal operation of the system. This is achieved by using a hybrid approach of simulation and estimation. Forcing the determined values for the TSEP to match results in the whole system being characterized based on easily accessible quantities. The improved concept of the present invention is widely applicable to many kinds of electric or electronic systems, which requires merely a suitable choice of parameters.

An effective re-calibration of system or device temperature sensitivity throughout the life of the system is achieved. Therefore, long-term changes in electrical and thermal parameters are tracked throughout the lifetime of the device, meaning that a condition monitoring is inherently provided.

Another advantage of the improved concept of the present invention is that no prior knowledge of the device characteristics is required except for an approximate estimate of the TSEP characteristics. The latter may depend on a mathematical model being used, including least square fitting, adaptive filtering, Kalman filtering and principal components analysis. Datasheet parameters may also be sufficient.

In case of power converters, no changes to power converter modules are required, in particular no extra connections or sensors within the module are required.

Implementations according to the improved concept of the present invention may involve junction temperature estimation of a power semiconductor device, which may enable several features in next generation of "smart" power converters, including: dynamic rating control (intelligent over-rate/de-rate), optimized parallel inverter stack current sharing, condition monitoring (detection of wear-out and abnormal operation, giving predictive maintenance), temperature cycle counting and remaining useful life estimation, improved validation of inverter stack design during development and type testing, improved over-temperature detection.

Resulting benefits to manufacturers of power converters may include an optimized performance (for example current rating or efficiency) versus costs, for example through reduction of margins. Benefits to the end users of power converters may include the early detection of abnormal operation and potentially reduced operating costs.

To demonstrate the effect of lacking calibration in case the improved concept is not utilized, product variations of an IGBT for use in a power converter are considered as an example. Typically, an on-state voltage drop or a gate threshold voltage of an IGBT may have a variation range of ±100 mV or even more for 95% of production batches. When combined with a typical TSEP sensitivity of 1-10 mV/K this gives an error in the range of 10-100° C. which would make junction temperature estimation pointless. This highlights the benefits of the improved concept.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS $T_b$ base plate temperature
$t_{on}$ total on-state duration
$t_{off}$ total off-state duration
$I_{on}$ on-state current
$V_{on}$ on-state voltage
$V_{off}$ off-state voltage
$T_j$ junction temperature
$T_{j-b}$ temperature difference
$P_{SW}$ switching power loss
$P_{cond}$ conduction power loss
$P_{sh}$ self-heating power dissipation
$P_{cc}$ cross-coupling power dissipation
V1, V2 values for the TSEP
M_th thermal model
M_TSEP model
CALC calculation step
P_th thermal parameters
P_TSEP parameters
PC power converter
CU computing unit
MU measuring unit
C circuit
PS power semiconductor device
T tank
IM insulation agent
W1, W2, W3 windings of transformer or reactor

The invention claimed is:

1. A method for determining a characteristic temperature of an electric or electronic system, the method comprising:
during operation of the electric or electronic system, directly measuring, with a measuring unit coupled with the system, one or more characteristic parameters of the system to determine a set of measured characteristic parameters, the set of measured characteristic parameters comprising a first subset and a second subset;
estimating the characteristic temperature using a pre-determined thermal model of the electric or electronic system and the first subset of the set of measured characteristic parameters, the thermal model comprising one or more thermal model parameters and being preconfigured to estimate at least one thermal characteristic of the system based on the first subset of the set of measured characteristic parameters and the thermal model parameters, the thermal characteristic comprising the characteristic temperature or the characteristic temperature being estimatable from the thermal characteristic;
predicting a first value for a temperature-sensitive electrical parameter (TSEP) using a pre-determined TSEP model and the estimated characteristic temperature, the TSEP model comprising one or more model parameters and being preconfigured to predict the first value of the TSEP based on the estimated characteristic temperature and the model parameters;
determining a second value for the temperature-sensitive electrical parameter (TSEP) as a function of the second subset of the set of measured characteristic parameters;
comparing the first value for the TSEP with the second value for the TSEP; and
adapting the thermal model or the TSEP model based on a result of the comparison between the first value for the TSEP and the second value for the TSEP, the adapting comprising updating at least one value of the thermal model parameters or the model parameters.

2. The method according to claim 1, comprising:
predicting a first further value for a further TSEP of the system using a pre-determined further TSEP model and the estimated characteristic temperature, the further TSEP being different than the TSEP, the further TSEP model comprising one or more further model parameters and being preconfigured to predict the first further value based on the further TSEP parameters and the estimated characteristic temperature;
determining a second further value for the further TSEP based on the second subset of the set of measured characteristic parameters;
comparing the first further value of the further TSEP with the second further value for the further TSEP;
wherein the adaption of the thermal model or the TSEP model is based on a result of the comparison of the first further value and the second further value for the further TSEP.

3. The method according to claim 1, wherein:
the method further comprises repeating at least the steps of measuring the characteristic parameters, estimating the characteristic temperature, and predicting the first value for the TSEP until the difference between the first value and the second value is below a predetermined threshold;

for each repetition, the newly adapted thermal model is used instead of the thermal model or the newly adapted TSEP model is used instead of the TSEP model;

upon determining that the difference between the first value and the second value is below the predetermined threshold, the estimated characteristic temperature determined by the newly adapted thermal model is output as the determined characteristic temperature; and the method comprises operating the electric or electronic system based on the determined characteristic temperature.

4. The method according to claim 1, wherein the characteristic temperature is a characteristic temperature of an electric or electronic device comprised by the electric or electronic system.

5. The method according to claim 4, wherein:
the electric or electronic system is a power electronic system; and
the characteristic temperature is a characteristic temperature of a power semiconductor device comprised by the electric or electronic system.

6. The method according to claim 5, wherein the first subset of the set of measured characteristic parameters comprises at least one of the following parameters:
an on-state current of the power semiconductor device;
an on-state voltage of the power semiconductor device;
an off-state voltage of the power semiconductor device;
a total on-state duration of the power semiconductor device within a respective measurement interval;
a total off-state duration of the power semiconductor device within the respective measurement interval; or
a reference temperature of the power electronic system.

7. The method according to claim 5, wherein the second subset of the set of measured characteristic parameters comprises an on-state current or an on-state voltage of the power semiconductor device.

8. The method according to claim 5, wherein the TSEP is:
an on-state voltage of the power semiconductor device; or
a gate threshold voltage of the power semiconductor device; or
an internal gate resistance of the power semiconductor device; or
a characteristic switching parameter of the power semiconductor device.

9. The method according to claim 4, wherein the step of estimating the characteristic temperature comprises:
determining a power dissipation of the electric or electronic device; and
using the power dissipation as an input to the thermal model.

10. The method according to claim 9, wherein the power dissipation comprises a switching power dissipation or a conduction power dissipation of a power semiconductor device, the device comprising the power semiconductor device.

11. The method according to claim 4, wherein the step of estimating the characteristic temperature comprises
determining a cross-coupling power dissipation due to a cross-coupling between the device of the system and a further device of the system; and
using the cross-coupling power dissipation as an input to the thermal model.

12. An electric or electronic system, the electric or electronic system comprising:
an electric or electronic device;
a measuring unit coupled with the electric or electronic device and configured to directly measure one or more characteristic parameters of the electric or electronic device during operation of the electric or electronic system to determine a set of measured characteristic parameters, the set of measured characteristic parameters comprising a first subset and a second subset;
a processor configured to:
estimate a characteristic temperature of the electric or electronic device using a pre-determined thermal model of the electric or electronic system and the first subset of the set of measured parameters, the thermal model comprising one or more thermal model parameters and being preconfigured to estimate at least one thermal characteristic of the system based on the first subset of the set of measured characteristic parameters and the thermal model parameters, the thermal characteristic comprising the characteristic temperature or the characteristic temperature being estimatable from the thermal characteristic;
predict a first value for a temperature sensitive electrical parameter (TSEP) based on a pre-determined TSEP model and the estimated characteristic temperature, the TSEP model comprising one or more model parameters and being preconfigured to predict the first value of the TSEP based on the estimated characteristic temperature and the model parameters;
determine a second value for the temperature sensitive electrical parameter (TSEP) as a function of the second subset of the set of measured parameters;
compare the first value for the TSEP with the second value for the TSEP; and
adapt the thermal model or the TSEP model based on a result of the comparison between the first value for the TSEP and the second value for the TSEP, wherein adapting comprises updating at least one value of the thermal model parameters or the model parameters.

13. The electric or electronic system according to claim 12 comprising a power transformer or a reactor, wherein:
the electric or electronic device comprises a winding, the power transformer or the reactor comprising the winding; and
the characteristic temperature is a winding temperature of the winding.

14. The electric or electronic system according to claim 12 comprising a power electronic system, wherein:
the electric or electronic device comprises a power semiconductor device; and
the characteristic temperature is a junction temperature of the power semiconductor device.

15. The electric or electronic system according to claim 14, wherein
the power electronic system comprises a power converter comprising the power semiconductor device.

16. The method according to claim 5, wherein the characteristic temperature is a junction temperature of the power semiconductor device.

17. The method according to claim 8, wherein the on-state voltage of the power semiconductor device is at a predefined on-state current of the power semiconductor device; and the characteristic switching parameter of the power semiconductor device is at a predefined on-state voltage or off-state voltage or on-state current.

\* \* \* \* \*